United States Patent
Peeters

(10) Patent No.: US 12,001,347 B2
(45) Date of Patent: Jun. 4, 2024

(54) MEMORY STORAGE DEVICE AND METHOD

(71) Applicant: Proton World International N.V., Diegem (BE)

(72) Inventor: Michael Peeters, Tourinnes-la-Grosse (BE)

(73) Assignee: PROTON WORLD INTERNATIONAL N.V., Diegem (BE)

( * ) Notice: Subject to any disclaimer, the term of this patent is extended or adjusted under 35 U.S.C. 154(b) by 0 days.

(21) Appl. No.: 17/653,382

(22) Filed: Mar. 3, 2022

(65) Prior Publication Data
US 2022/0327064 A1 Oct. 13, 2022

(30) Foreign Application Priority Data

Apr. 8, 2021 (FR) ...................................... 2103600

(51) Int. Cl.
| | |
|---|---|
| *G06F 12/14* | (2006.01) |
| *G06F 12/02* | (2006.01) |
| *G06F 21/62* | (2013.01) |
| *H04L 9/00* | (2022.01) |

(52) U.S. Cl.
CPC ...... *G06F 12/1408* (2013.01); *G06F 12/0238* (2013.01); *G06F 12/1441* (2013.01); *G06F 12/1458* (2013.01)

(58) Field of Classification Search
CPC ............ G06F 12/1408; G06F 12/0238; G06F 12/1441; G06F 12/1458
USPC ...................................................... 711/163
See application file for complete search history.

(56) References Cited

U.S. PATENT DOCUMENTS

| | | | |
|---|---|---|---|
| 2003/0037248 A1* | 2/2003 | Launchbury | G06F 12/1408 713/193 |
| 2009/0180494 A1* | 7/2009 | Ren | H04L 49/901 370/476 |
| 2019/0138914 A1* | 5/2019 | Meadows | G06N 5/022 |
| 2020/0004694 A1* | 1/2020 | Szubbocsev | G06F 21/79 |
| 2021/0117342 A1* | 4/2021 | Durham | G06F 12/1491 |
| 2022/0035552 A1* | 2/2022 | Jain | G06F 3/0619 |
| 2022/0374365 A1* | 11/2022 | Liljedahl | G06F 9/544 |

FOREIGN PATENT DOCUMENTS

| | | |
|---|---|---|
| EP | 3045184 A1 | 7/2020 |
| WO | 02077878 A1 | 10/2002 |

OTHER PUBLICATIONS

Bailey, Katelin et al., "Operating System Implications of Fast, Cheap, Non-Volatile Memory", Computer Science, HotOS, US, May 2011, 5 pages.

Cowan, Crispin et al., "PointGuardTM: Protecting Pointers From Buffer Overflow Vulnerabilities", http://wirex.com//, Immunix, Inc., 12th Usenix Security Symposium, Washington, D.C., Aug. 4-8, 2003, 15 pages.

* cited by examiner

*Primary Examiner* — Arpan P. Savla
*Assistant Examiner* — Sidney Li
(74) *Attorney, Agent, or Firm* — Slater Matsil, LLP

(57) ABSTRACT

The present disclosure relates to secure storage, in a non-volatile memory, of initial data encrypted using a second data, including selecting a pointer aimed at an initial address of a memory cell of an initial part of the non-volatile memory, and encrypting the pointer using the second data; and storing the encrypted pointer in the non-volatile memory.

20 Claims, 6 Drawing Sheets

MEMORY STORAGE DEVICE AND METHOD

CROSS-REFERENCE TO RELATED APPLICATIONS

This application claims the benefit of French Patent Application No. 2103600, filed on Apr. 8, 2021, which application is hereby incorporated herein by reference.

TECHNICAL FIELD

The present disclosure relates generally to electronic circuits and devices and more particularly to the protection of data stored by such circuits and devices. More particularly, the present disclosure applies to the protection of data stored in non-volatile memory. The present disclosure relates to devices and methods for storing data in a non-volatile memory and related reading of the data.

BACKGROUND

There are many techniques for protecting data stored by electronic devices. Cryptographic techniques, such as data encryption, are particularly used for this purpose. Data encryption is an operation by which usable and readable data is transformed, using a code, into data that can only be read by persons or machines familiar with the code. This code generally uses an encryption and/or decryption key.

It would be desirable to be able to improve at least some aspects of known non-volatile memory storage techniques.

SUMMARY

There is a need for more secure non-volatile memory data storage methods.

There is a need for more secure non-volatile memory data reading methods.

There is a need for methods for reading data from non-volatile memory that are more resistant to fault injection and/or probe attacks.

There is a need for more secure reading methods using passwords and/or access keys.

One embodiment addresses all or some of the drawbacks of known non-volatile memory data storage methods.

One embodiment addresses some or all of the drawbacks of known non-volatile memory data reading methods.

One embodiment provides a method for securely storing initial encrypted data in a non-volatile memory, by using secondary data, comprising selecting a pointer aiming towards an initial address of a memory cell of an initial part of the non-volatile memory, encrypting the pointer using the second data, and storing the encrypted pointer in the non-volatile memory.

According to one embodiment, the pointer is randomly selected.

According to one embodiment, the pointer is selected from a predefined group of pointers to memory cell addresses of the initial part of the non-volatile memory.

According to one embodiment, the initial encrypted data is stored at the initial address pointed to by the pointer.

According to one embodiment, the initial data is encrypted by further using third data stored at the initial address pointed to by the pointer.

According to one embodiment, the initial data is stored in a memory cell, having a second address, not belonging to the initial part of the non-volatile memory.

According to one embodiment, the initial part is a non-rewritable part of the non-volatile memory.

Another embodiment provides a method for reading initial data encrypted and securely stored in a non-volatile memory, comprising sending second data, decrypting a pointer with the second data, verifying that the pointer points to an address of an initial part of the non-volatile memory, and decrypting the initial data using the second data.

According to one embodiment, the initial encrypted data is read from the initial address pointed to by the pointer.

According to one embodiment, the initial data is decrypted by additionally using third data stored at the initial address pointed to by the pointer.

According to one embodiment, the initial encrypted data is stored in a memory cell, having a second address, not belonging to the initial part of the non-volatile memory.

According to one embodiment, the initial part is a non-rewritable part of the non-volatile memory.

Still another embodiment provides an electronic system suitable for implementing the storage method previously described.

Still another embodiment provides an electronic system suitable for implementing the reading method previously described.

Still another embodiment provides an electronic system suitable for implementing the storage method previously described and to implement the reading method previously described.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the encryption techniques used will not be described, with the person skilled in the art able to choose the encryption techniques suitable for the embodiments presented in the description.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
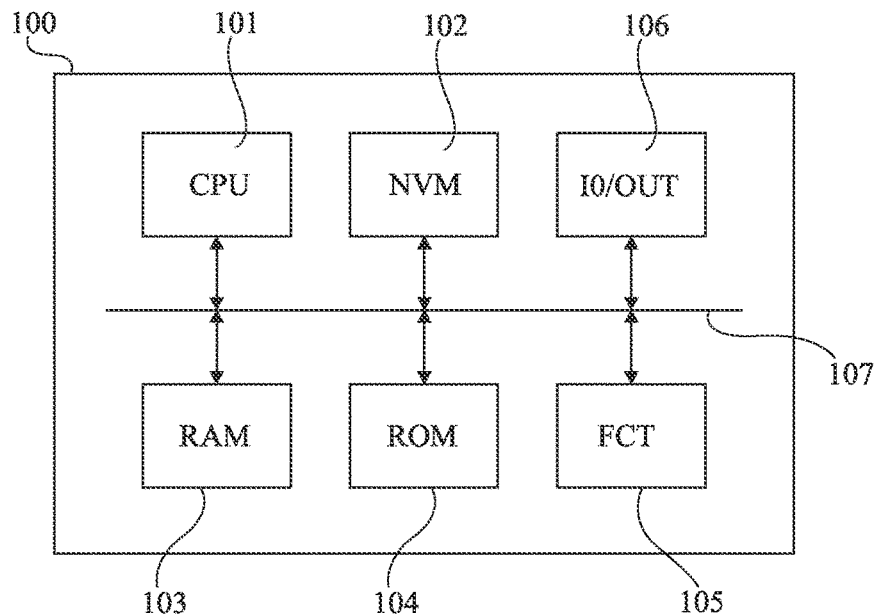
FIG. 1 shows, schematically and in block form, an electronic device to which the described embodiments apply.

FIG. 1 shows, very schematically and in block form, an example architecture of an electronic system 100.

The electronic system 100 comprises a processor 101 (CPU) suitable for implementing different processing of data stored in the memories and/or provided by other circuits of the system 100.

The electronic system 100 further comprises different memory types, including non-volatile memory 102 (NVM), volatile memory 103 (RAM) and read-only memory 104 (ROM), for example. Each memory is suitable for storing different data types.

The electronic system 100 further comprises various circuits 105 (FCT) suitable for implementing different functions. By way of example, the circuits 105 may comprise measurement circuits, data conversion circuits, encryption circuits, etc.

The electronic system 100 may further comprise interface circuits 106 (Io/OUT) suitable for sending and/or receiving data from outside the system 100. The interface circuitry 106 may further be suitable for implementing a data display such as a display screen.

The electronic system wo further comprises one or more data buses 107 suitable for transferring data between its various components. More particularly, the bus 107 is suitable for transferring data between the various memories 102-104, the processor 101, the circuits 105, and the interface circuits 106.

Figure 2:
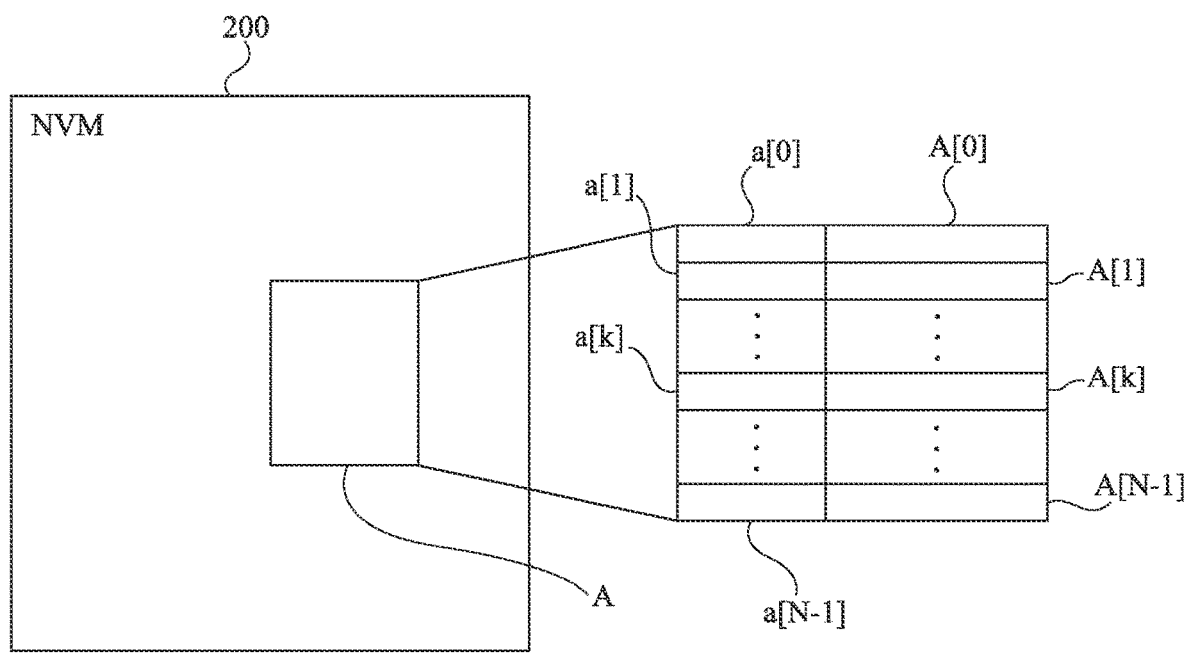
FIG. 2 shows, schematically, a non-volatile memory.

FIG. 2 shows, schematically and in block form, an example of a non-volatile memory 200 (NVM) that may be used in an electronic system of the type of system 100 described in connection with FIG. 1.

The non-volatile memory 200 comprises memory cells, generally arranged in rows and columns. Each memory cell is suitable for storing data, such as a binary word. Further, each memory cell is characterized by its address. The address of a memory cell indicates the location of the memory cell in the memory, and generally corresponds to the row and column number of the memory cell. In the remainder of the description, when referring to data being stored at an Add address in the memory, this means that the data is stored in a memory cell with an Add address.

Further, when referring to a pointer, it means data storing the address of a memory cell in which data may be stored.

The non-volatile memory 200 may be divided into several parts. Different parts of the memory may be dedicated to storing data of different types, such as data from different electronic devices or circuits. In addition, parts of the memory 200 may be rewritable or non-rewritable. According to one embodiment, the memory 200 comprises at least one part A comprising N memory cells. In FIG. 2, the memory cells are denoted A[0], A[1], . . . , A[k], . . . , A[N−1].

The non-volatile memory 200 is used here to store secret data. The embodiments described in connection with FIGS. 3 through 7 all apply to a memory of the type of memory 200.

Figure 3:
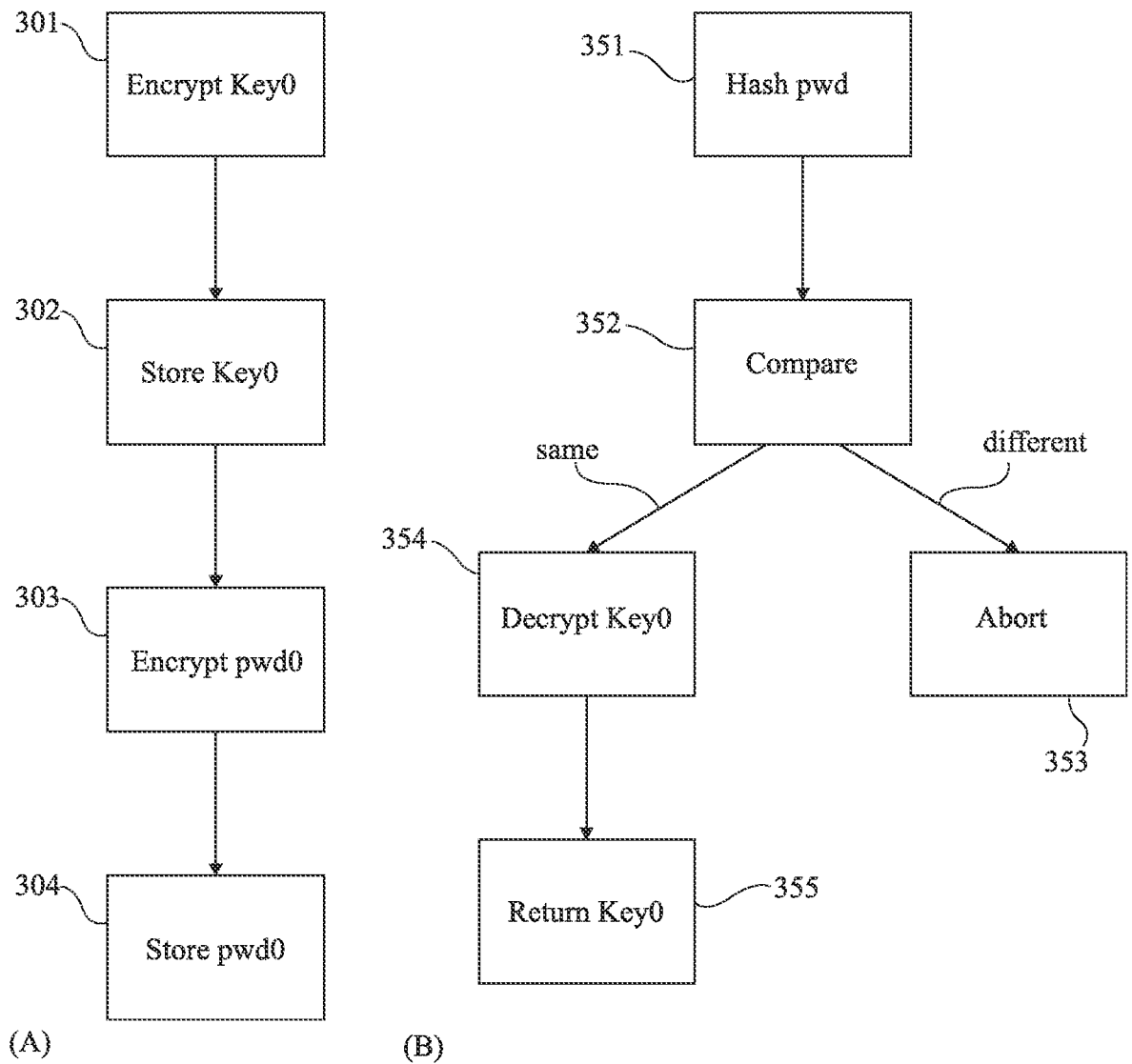
FIG. 3 shows, schematically and in block form, a secure data storage method in a non-volatile memory.

FIG. 3 comprises two block diagrams (A) and (B), respectively illustrating an example of a method for storing secret data Key0 in the memory 200 of FIG. 2, and an example of a corresponding or related method for reading the secret data Key0.

The object of the block diagram storage method (A), or storage method (A), is to encrypt the secret data Key0, and then store it at an address AddK0 in the memory 200. The flow of the storage method (A) is as follows.

In a step 301 ("Encrypt Key0"), the secret data Key0 is encrypted using an encryption function e, taking as input at least the secret data Key0, and a data pwd0. The data pwd0 is the encryption key of the data Key0. The encrypted data Key0 is then noted: e[pwd0](Key0). According to one example, the encryption function e is a symmetrical encryption function.

In a step 302 ("Store Key0"), subsequent to step 301, the encrypted secret data e[pwd0](Key0) is stored at the address AddK0 in the memory 200.

In a step 303 ("Encrypt pwd0"), subsequent to step 302, the data pwd0 is encrypted using a function H, taking as input only the data pwd0. The result of the encryption of the data pwd0 by the function H is encrypted data, noted H(pwd0). The function H is a non-invertible function, for example. According to one example, the function H is a hash function or a signature function.

In a step 304 ("Store pwd0"), subsequent to step 303, the encrypted data H(pwd0) is stored at an address AddP0 in the memory 200.

The block diagram reading method (B), or reading method (B), is intended to make the secret data accessible to an element by sending only the data pwd0. The element can be an electronic device such as a processor. The flow of the reading method (B) is as follows.

In a step 351 ("Hash pwd"), the element wishing to have access to the secret data Key0 sends data pwd. The data pwd is then encrypted using the function H, the result of this encryption is noted H(pwd).

In a step 352 ("Compare"), subsequent to step 351, the encrypted data H(pwd) is compared to the encrypted data H(pwd0) stored at the address AddP0. If the data H(pwd) and H(pwd0) are different (output "different") then the next step is a step 353 ("Abort"), otherwise (output "same") then the next step is a step 354 ("Decrypt Key0").

At step 353, following step 352, with the element wishing to have access to the secret data Key0 has not sent the right data pwd, the reading method stops there, the data Key0 is neither decrypted nor returned to the element.

In step 354, subsequent to step 352, with the element wishing to have access to the secret data Key0 has sent the correct data pwd, the encrypted data e[pwd0](Key0) is decrypted using the data pwd equal to the data pwd0.

In a step 355 ("Return Key0"), subsequent to step 354, the decrypted Key0 data is sent to the element.

A drawback of this example is that the reading method described here is sensitive to so-called fault injection attacks and probe attacks. Indeed, in this example, the address AddK0 at which the encrypted data e[pwd0](Key0) is stored is accessible, it is sufficient to skip step 352, by injecting a fault for example, to gain access to the encrypted data e[pwd0](Key0).

Figure 4:
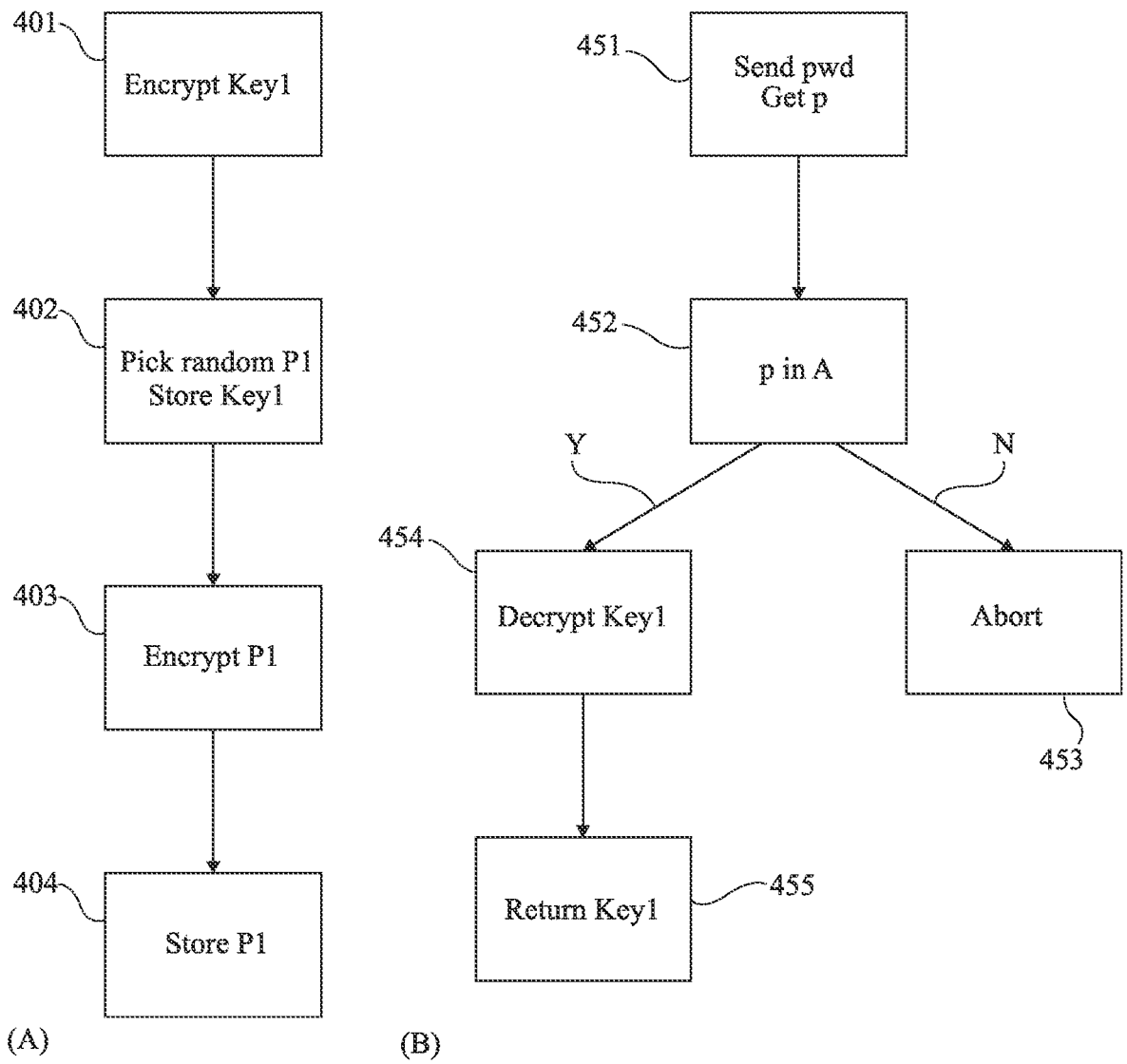
FIG. 4 shows, schematically and in block form, an embodiment of a secure data storage method in a non-volatile memory, and the embodiment of the related method for reading the data.

FIG. 4 comprises two block diagrams (A) and (B), respectively illustrating an embodiment of a method for storing secret data Key1 in the memory 200 of FIG. 2, and an embodiment of a related method for reading the secret data Key1.

The object of the block diagram storage method (A), or storage method (A), is to encrypt the secret data Key1, and then store it at a secret address AddP1 of a memory cell in part A of the memory 200. The flow of the storage method (A) is as follows.

In a step 401 ("Encrypt Key1"), the secret data Key1 is encrypted using an encryption function E, taking as input at least the secret data Key1 and data pwd1. The data pwd1 is the encryption key of the data Key1. the encrypted data is then noted Key1: E[pwd1](Key1). Like the encryption function e described in connection with FIG. 3, the function E is a symmetric encryption function such as a block encryption function such as AES (Advanced Encryption Standard).

In a step 402 ("Pick Random P1 Store Key1"), subsequent to step 401, the address AddP1 is randomly selected from the part A of the memory 200, and a pointer P1 to the address AddP1 is generated. In other words, a pointer P1 is chosen.

Further, in step 402, the encrypted secret data E[pwd1](Key1) is stored at the address AddP1 referred to by the pointer P1.

In a step 403 ("Encrypt P1"), subsequent to step 402, the pointer P1 is encrypted using the same function E used for encrypting the secret data Key1. In addition, the pointer P1 is encrypted using the same data pwd1 as the encryption key. The result of encryption of the pointer P1 by the function E is an encrypted data noted E[pwd1](P1).

In a step 404 ("Store P1"), subsequent to step 403, the encrypted data E[pwd1](P1) is stored at an address Add1 in the memory 200; preferably the memory cell of address Add1 is not included in part A of memory 200.

The block diagram reading method (B), or reading method (B), is intended to make the secret data Key1 accessible to an element by sending only the data pwd1. As before, the element can be an electronic device such as a processor, for example. The flow of the reading method (B) is as follows.

At a step 451 ("Send pwd Get p"), as in the reading method of FIG. 3, the element wishing to have access to the secret data Key1 sends the data pwd.

Further, in step 451, the encrypted data E[pwd1](P1) stored at the address Add1 is decrypted using the data pwd as the decryption key. A pointer p is then obtained.

In a step 452 ("p in A"), subsequent to step 451, it is checked whether the pointer p is aimed at an address belonging to part A of the memory 200. If the pointer p is aimed at an address outside part A (output "N"), the next step is a step 453 ("Abort"), otherwise (output "Y"), the next step is a step 454 ("Decrypt Key1").

In step 453, subsequent to step 452, the element wishing to access the secret data Key1 has not sent the correct data pwd, so the pointer p is not aimed at an address in part A of the memory 200. The reading method stops here, the data Key1 is neither decrypted nor returned to the element.

In step 454, following step 452, the pointer p is aimed at an address in part A, and the pointer p is then considered to be aimed at the same address AddP1 as the pointer P1. The data A[AddP1] stored at address AddP1, i.e., the data E[pwd1](Key1) is decrypted using the data pwd as decryption key.

In a step 455 ("Return Key1"), subsequent to step 454, the element receives the decrypted Key1 data.

An advantage of this embodiment is that the address at which the secret data Key1 is kept secret, and must be decrypted to provide access to the encrypted data E[pwd1](Key1).

Thus, as long as the element wishing to have access to the secret data Key1 has not sent the correct data pwp1, no access will be given to the memory cell containing the desired secret data, and it will not be possible to extract it either by probe attack or by fault injection.

Figure 5:
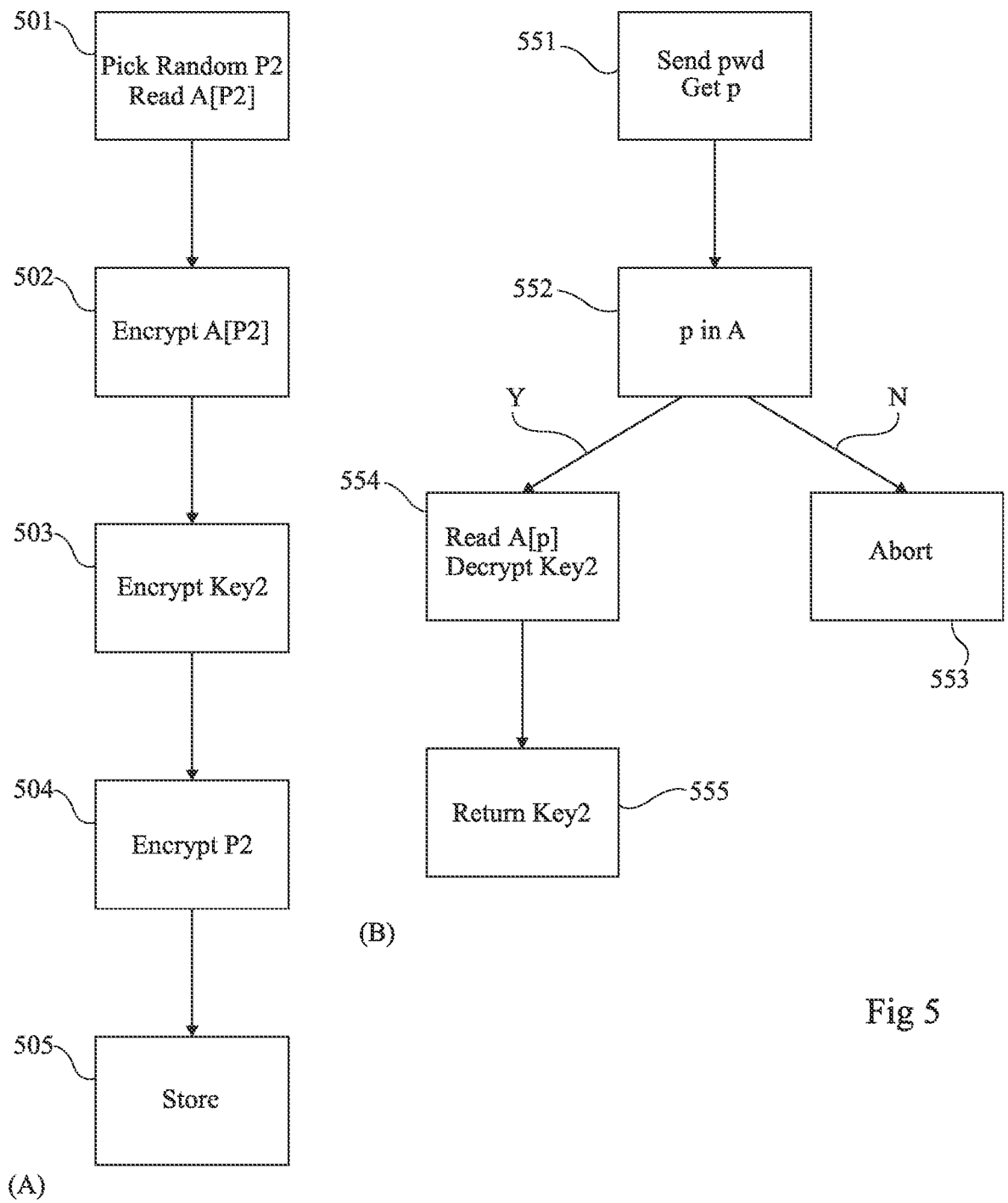
FIG. 5 shows, schematically and in block form, another embodiment of a secure data storage method in a non-volatile memory, and the embodiment of the related method for reading the data.

FIG. 5 comprises two block diagrams (A) and (B), respectively illustrating one embodiment of a method for storing secret data Key2 in the memory 200 of FIG. 2, and one embodiment of a related method for reading the secret data Key2.

The object of the block diagram storage method (A), or storage method (A), is to encrypt the secret data Key2 using a data stored at a secret address AddP2 of a memory cell in the memory part A of the memory 200. The flow of the storage method (A) is as follows. According to one embodiment, the part A of the memory 200 is a non-rewritable part.

In a step 501 ("Pick Random P2 Read A[P2]"), the address AddP2 is randomly selected from the part A of the memory 200, and a pointer P2 to the address AddP2 is generated. In other words, a pointer P2 is chosen.

Further, in step 501, the data A[P2] stored at the AddP2 address referred to by the pointer P2 is read.

In a step 502 ("Encrypt A[P2]"), subsequent to step 501, the data A[P2] is encrypted using the encryption function E, described in relation to FIG. 4, and a data pwd2 as encryption key. The encrypted data A[P2] is then noted: E[pwd2](A[P2]).

In a step 503 ("Encrypt Key2"), subsequent to step 502, the secret data Key2 is encrypted using an encryption function F, taking as input at least the secret data Key2, and the data E[pwd2](A[P2]). The data E[pwd2](A[P2]) is the encryption key of the data Key2. We note then the encrypted data Key2: F[E[pwd2](A[P2])](Key2). The encryption function F is of the same type as the encryption function E described in relation to FIG. 4. According to one example, the encryption function F is an EXCLUSIVE OR function.

In a step 504 ("Encrypt P2"), subsequent to step 503, the pointer P2 is encrypted using the same function E used for the encryption of the data A[P2]. In addition, the pointer P2 is encrypted using the same data pwd2 as the encryption key. The result of the encryption of the pointer P2 by the function E is an encrypted data noted E[pwd2](P2).

In a step 505 ("Store"), subsequent to step 504, the data F[E[pwd2](A[P2])](Key2) and E[pwd2](P2), i.e., the encrypted data Key2 and pointer P2, are stored in the memory 200. According to one embodiment, the data F[E[pwd2](A[P2])](Key2) and E[pwd2](P2) are stored in the memory 200 but outside the part A of the memory 200. More particularly, the data F[E[pwd2](A[P2])](Key2) is stored at an AddK2 address, and the data E[pwd2](P2) is stored at an Add2 address.

The block diagram reading method (B), or reading method (B), is intended to make the secret data accessible to an element by sending only the data pwd2. As before, the element may be an electronic device such as a processor, for example. The flow of the reading method (B) is as follows.

At a step 551 ("Send pwd Get p"), as in the reading method of FIG. 4, the element wishing to have access to the secret data Key2 sends a data pwd.

Further, in step 551, the encrypted data E[pwd2](P2) stored at address Add2 is decrypted using the data pwd as the decryption key. As in FIG. 4, a pointer p is then obtained.

In a step 552 ("p in A"), subsequent to step 551, it is checked whether the pointer p is aimed at an address belonging to part A of the memory 200. If the pointer p is aimed at an address outside the part A (output "N"), the next step is a step 553 ("Abort"), otherwise (output "Y"), the next step is a step 554 ("Read A[p] Decrypt Key2").

In step 553, subsequent to step 552, the element wishing to have access to the secret data Key2 has not sent the right data pwd, so the pointer p is not aimed at an address of the part A of the memory 200. The reading method stops here, the data Key2 is neither decrypted nor returned to the element.

In step 554, following step 552, the pointer p is aimed at an address in part A. The pointer p is then considered aimed at the same address AddP2 as the pointer P2. The data stored at the address AddK2, i.e. the data F[E[pwd](A[P2])](Key2) is decrypted using the data E[pwd](A[P2]) as decryption key, i.e. the data A[P2] read at the address AddP2 and encrypted by the data pwd.

In a step 555 ("Return Key2"), subsequent to step 554, the element receives the decrypted Key2 data.

An advantage of this embodiment is that the secret data Key2 is encrypted using not only the data pwd, but also the data A[P2] randomly selected from the part A of the memory 200. If the pointer P2 is incorrectly decrypted, then the secret data Key2 cannot be decrypted.

Another advantage is that, in some implementations that use a large non-rewritable memory, this increases the size of area A, and makes it more difficult to extract the sensitive data A[P2].

According to one alternative embodiment, the pointer P2 can be chosen from a predefined group of pointers to addresses in the part A of the memory 200. This predefined list of pointers can be used to store constant data that are only used for the storage method described herein. Indeed, by randomly selecting an address AddP2, it is possible that the data A[P2] stored at that address is regularly used data that could "catch the attention" of a user trying to retrieve the secret data Key2.

Figure 6:
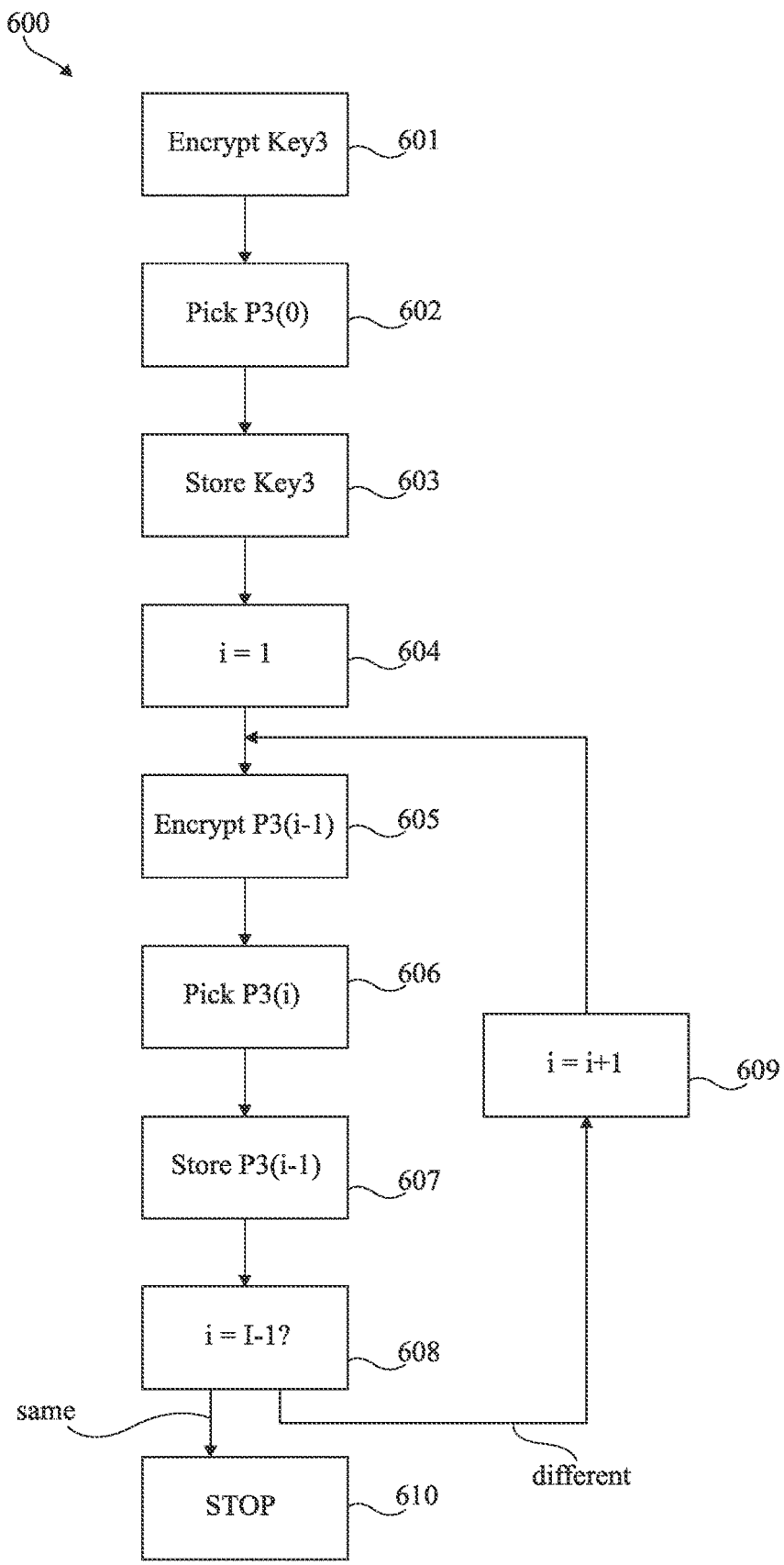
FIG. 6 shows, schematically and in block form, another embodiment of a secure data storage method in a non-volatile memory.
Figure 7:
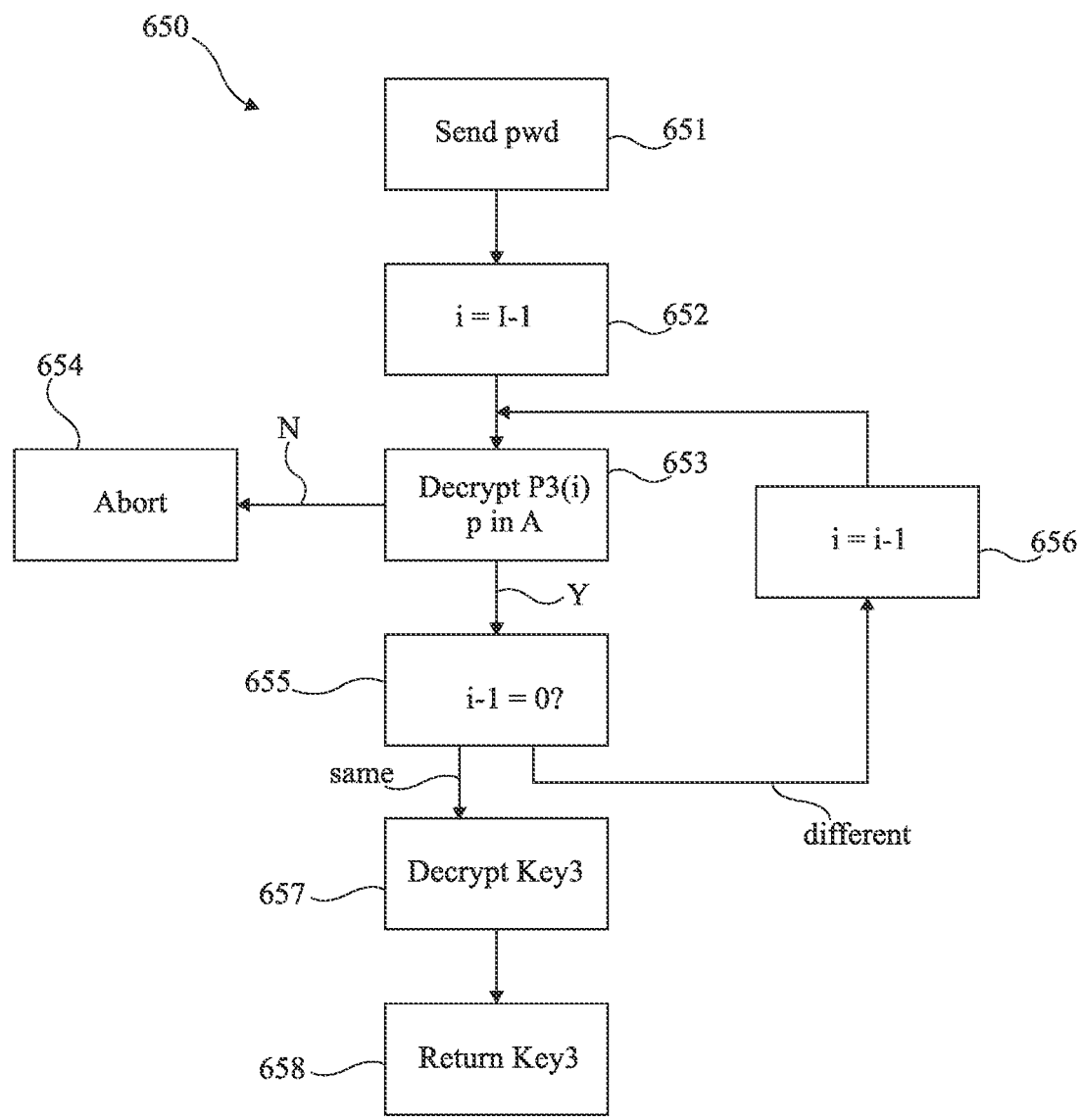
FIG. 7 shows, schematically and in block form, an embodiment of the reading method associated with the embodiment of the storage method of FIG. 7.

FIGS. 6 and 7 show block diagrams 600 and 650, respectively illustrating one embodiment of a method for storing secret data Key3 in the memory 200 of FIG. 2, and one embodiment of a related method for reading the secret data Key3.

In FIG. 6, the storage method of block diagram 600, or storage method 600, is intended to store the secret data Key3 at a secret address AddP3(0) of a memory cell of memory part A of memory 200 with which a pointer P3(0) is related. Further, the storage method uses a string comprising I addresses AddP3(0), ..., AddP3(I−1) of memory cells of the part A of the memory 200 to store the secret data Key3. I is a natural number greater than or equal to two and less than N, the number of memory cells of the part A of the memory 200. A string of I pointers P3(0), ..., P3(I−1) is associated with the string of I addresses AddP3(0), ..., AddP3(I−1). The flow of the storage method 600 is as follows.

In a step 601 ("Encrypt Key3"), the secret data Key3 is encrypted using the encryption function E, described in connection with FIG. 3, taking as input at least the secret data Key$_3$, and a data pwd3. The data pwd3 is the encryption key of the data Key$_3$. The encrypted data Key$_3$ is then noted: E[pwd3](Key3).

In a step 602 ("Pick P3(0)"), subsequent to step 601, the initial address AddP3(0) of the address string is randomly chosen in the part A of the memory 200. A pointer P3(0) to the address AddP3(0) is generated. In other words, a pointer P3(0) is chosen.

According to one variant, the initial address AddP3(0) may be chosen from a predefined list of addresses of the part A.

In a step 603 ("Store Key3"), subsequent to step 602, the encrypted secret data E[pwd3](Key3) is stored at the address AddP3(0).

In a step 604 ("i=1"), subsequent to step 603, an internal count data i is initialized to one, i being a natural number.

At a step 605 ("Encrypt P3(i−1)"), the pointer P3(i−1) of index equal to i−1 is encrypted using the encryption function E and using the data pwd3 as encryption key. The encrypted pointer P3(i−1) is then noted E[pwd3](P3(i−1)). When the step 605 is directly consecutive to step 604, the pointer P3(i−1) is the pointer P3(0).

In a step 606 ("Pick P3(i)"), subsequent to step 605, an address AddP3(i) of index equal to i of the address string is randomly selected from part A of the memory 200. A pointer P3(i) of index equal to i targeting the address AddP3(i) is generated. In other words, a pointer P3(i) is chosen. It is to be noted that, the pointer P3(I−1) is a value known by the reading method described in relation to FIG. 7, in particular a fixed value independent of the data pwd.

As before, according to one variant, the address AddP3(i) may be selected from a predefined list of addresses of the part A. In other words, the addresses AddP3(0) through AddP3(I−1) are not necessarily consecutive.

In a step 607 ("Store P3(i−1)"), subsequent to the step 606, the encrypted pointer E[pwd3](P3(i−1)) is stored at the address AddP3(i) referred to by the pointer P3(i).

In a step 608 ("1=I−1?"), subsequent to step 607, the internal count data i is compared to the value I decremented by one, denoted I−1. If the data i is different from the value I−1 (output "different"), the next step is a step 609 ("i=i+1"), otherwise (output "same"), the next step is a step 610 ("STOP").

In step 609, the internal count data i is incremented by one, the next step is step 605.

In step 610, all addresses AddP3(0), ..., AddP3(I−1) of the address string have been used, the storage method is ended.

In FIG. 7, the block diagram reading method 650, or reading method 650, is intended to make the secret data accessible to an element by sending only the data pwd3. As before, the element may be an electronic device such as a processor, for example. The sequence of the reading method (B) is as follows.

At a step 651 ("Send pwd"), as in the reading methods of FIGS. 4 and 5, the element wishing to have access to the secret data Key3 sends data pwd.

In a step 652 ("i=I−1"), subsequent to step 651, the internal count data 1 is initialized to the value I decremented by one, always noted I−1.

In a step 653 ("Decrypt P3(i), p in A"), the encrypted data E[pwd3](P3(i−1)) stored at the address AddP3(i) is decrypted using the data pwd as decryption key. As in FIG. 4, a pointer p is then obtained. The pointer P3(I−1) is known to the device implementing the reading method 650.

Further, in step 653, it is checked whether the pointer p is targeting an address belonging to the part A of the memory

200. If the pointer p is targeting an address outside the part A (output "N"), the next step is a step 654 ("Abort"), otherwise (output "Y"), the next step is a step 655 ("i−1=0?").

In step 654, following step 653, the element wishing to have access to the secret data Key3 has not sent the right data pwd, so the pointer p does not target an address of the part A of the memory. The reading method stops here, the Key3 data is neither decrypted nor returned to the element.

At step 655, following step 653, the pointer p is aimed at an address in part A, and the pointer p is then considered aimed at the same address AddP3(i) as the pointer P3(i). The reading method can continue.

The internal count data 1 decremented by 1, denoted i−1, is compared to the null value (zero). If the data i−1 is different from the null value (output "different"), the next step is a step 656 ("i=i−1"), otherwise (output "same"), the next step is a step 657 ("Decrypt Key3").

In step 656, the internal count data i is decremented by one, the next step is step 653.

In step 657, all the data stored at the addresses AddP3(1), . . . , AddP3(I−1) of the address chain have been decrypted, it only remains to decrypt the secret data Key3. The internal count data i is decremented by one to be equal to zero.

The pointer P3(0) is the last decrypted pointer; it targets the address AddP3(0) at which the encrypted data E[pwd3](Key3) is stored. The data E[pwd3](Key3) is decrypted using the data pwd as decryption key. With the data pwd having been used to decrypt the successive pointers P3(0), . . . , P3(I−1), the data pwd is considered equal to the data pwd3.

At a step 658 ("Return Key3"), consecutive to step 657, the element receives the decrypted Key3 data.

An advantage of the embodiment described in relation to FIGS. 6 and 7 is that it makes the reading method more complex, and thus more resistant to attacks.

Moreover, if, by mistake, a pointer decrypted with the data pwd different from the data pwd3 is aimed at an address comprised in the part A of the memory 200, the reading method will be put in default when decrypting the next pointer.

Various embodiments and variants have been described. Those skilled in the art will understand that certain features of these embodiments can be combined and other variants will readily occur to those skilled in the art.

In particular, the use of a pointer string may be suitable for the embodiment described in connection with FIG. 5.

Finally, the practical implementation of the embodiments and variants described herein is within the capabilities of those skilled in the art based on the functional description provided hereinabove.

What is claimed is:

1. A method for securely storing information, the method comprising:
   selecting a pointer aiming towards an initial address of a memory cell of an initial part of a non-volatile memory;
   reading a first data stored in the memory cell at the initial address;
   encrypting the first data using a second data;
   encrypting secret data using the encrypted first data;
   encrypting the pointer, including the initial address, using the second data; and
   storing the encrypted secret data and the encrypted pointer in of the non-volatile memory.

2. The method according to claim 1, wherein the pointer is randomly selected.

3. The method according to claim 1, wherein the pointer is selected from a predefined group of pointers aiming at memory cell addresses of the initial part of the non-volatile memory.

4. The method according to claim 1, wherein the encrypted secret data and the encrypted pointer are stored outside of the initial part the non-volatile memory.

5. The method according to claim 1, wherein the first data and the secret data are encrypted using a same type of encryption function.

6. The method according to claim 1, wherein the first data and the pointer are encrypted using a same encryption function.

7. The method according to claim 1, wherein the initial part is a non-rewritable part of the non-volatile memory.

8. A method for reading information securely stored in a non-volatile memory, the method comprising:
   sending a second data;
   reading an encrypted pointer, including an initial address of a memory cell of an initial part of the non-volatile memory, the encrypted pointer being stored in the non-volatile memory;
   decrypting the encrypted pointer using the second data;
   verifying that the decrypted pointer points to the initial address of the memory cell of the initial part of the non-volatile memory;
   reading a first data stored in the memory cell at the initial address;
   encrypting the first data using the second data;
   reading encrypted secret data stored in the non-volatile memory; and
   decrypting the encrypted secret data using the encrypted first data.

9. The method according to claim 8, wherein the encrypted pointer is a randomly-selected pointer.

10. The method according to claim 8, wherein the encrypted pointer is from a predefined group of pointers aiming at memory cell addresses of the initial part of the non-volatile memory.

11. The method according to claim 8, wherein the encrypted secret data is stored in a second memory cell having a second address, and not belonging to the initial part of the non-volatile memory.

12. The method according to claim 8, wherein the initial part is a non-rewritable part of the non-volatile memory.

13. An electronic system configured to securely store information, the electronic system comprising:
   a non-volatile memory;
   a non-transitory memory comprising instructions; and
   a processor in communication with the non-transitory memory, wherein the processor executes the instructions to:
      select a pointer aiming towards an initial address of a memory cell of an initial part of the non-volatile memory;
      read a first data stored in the memory cell at the initial address;
      encrypt the first data using a second data;
      encrypt secret data using the encrypted first data;
      encrypt the pointer, including the initial address, using the second data; and
      store the encrypted secret data and the encrypted pointer in the non-volatile memory.

14. The electronic system according to claim 13, wherein the pointer is randomly selected.

15. The electronic system according to claim 13, wherein the pointer is selected from a predefined group of pointers aiming at memory cell addresses of the initial part of the non-volatile memory.

16. The electronic system according to claim 13, wherein the encrypted secret data and the encrypted pointer are stored outside of the initial part the non-volatile memory.

17. An electronic system configured to read securely stored information, the electronic system comprising:
- a non-volatile memory;
- a non-transitory memory comprising instructions; and
- a processor in communication with the non-transitory memory, wherein the processor executes the instructions to:
  - send a second data;
  - read an encrypted pointer, including an initial address of a memory cell of an initial part of the non-volatile memory, wherein the encrypted pointer is stored in the non-volatile memory;
  - decrypt the encrypted pointer using the second data;
  - verify that the decrypted pointer points to the initial address of the memory cell of the initial part of the non-volatile memory;
  - read a first data stored in the memory cell at the initial address;
  - encrypt the first data using the second data;
  - read encrypted secret data stored in the non-volatile memory; and
  - decrypt the encrypted secret data using the encrypted first data.

18. The electronic system according to claim 17, wherein the encrypted pointer is a randomly-selected pointer.

19. The electronic system according to claim 17, wherein the encrypted pointer is from a predefined group of pointers aiming at memory cell addresses of the initial part of the non-volatile memory.

20. The electronic system according to claim 17, wherein the encrypted secret data is stored in a second memory cell having a second address, and not belonging to the initial part of the non-volatile memory.

\* \* \* \* \*

UNITED STATES PATENT AND TRADEMARK OFFICE
CERTIFICATE OF CORRECTION

PATENT NO. : 12,001,347 B2
APPLICATION NO. : 17/653382
DATED : June 4, 2024
INVENTOR(S) : Michael Peeters It is certified that error appears in the above-identified patent and that said Letters Patent is hereby corrected as shown below:

In the Claims

In Column 10, Line 7, Claim 4:
Change "outside of the initial part the non-volatile memory"
To --outside of the initial part of the non-volatile memory--

In Column 11, Line 7, Claim 16:
Change "outside of the initial part the non-volatile memory"
To --outside of the initial part of the non-volatile memory--

Signed and Sealed this
Sixteenth Day of July, 2024

Katherine Kelly Vidal
*Director of the United States Patent and Trademark Office*